United States Patent
Veige et al.

(10) Patent No.: US 12,077,626 B2
(45) Date of Patent: Sep. 3, 2024

(54) METALLACYCLOPENTADIENE INITIATORS FOR CYCLIC POLYMER SYNTHESIS FROM ALKYNES

(71) Applicant: UNIVERSITY OF FLORIDA RESEARCH FOUNDATION, INCORPORATED, Gainesville, FL (US)

(72) Inventors: Adam S. Veige, Gainesville, FL (US); Christopher D. Roland, Danville, CA (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 431 days.

(21) Appl. No.: 17/436,420

(22) PCT Filed: Mar. 3, 2020

(86) PCT No.: PCT/US2020/020745
§ 371 (c)(1),
(2) Date: Sep. 3, 2021

(87) PCT Pub. No.: WO2020/180843
PCT Pub. Date: Sep. 10, 2020

(65) Prior Publication Data
US 2022/0135709 A1    May 5, 2022

Related U.S. Application Data

(60) Provisional application No. 62/813,225, filed on Mar. 4, 2019.

(51) Int. Cl.
C08F 4/78    (2006.01)
C08F 8/04    (2006.01)
C08F 38/00    (2006.01)

(52) U.S. Cl.
CPC ............... *C08F 4/78* (2013.01); *C08F 8/04* (2013.01); *C08F 38/00* (2013.01)

(58) Field of Classification Search
None
See application file for complete search history.

(56) References Cited

U.S. PATENT DOCUMENTS

2014/0309389 A1    10/2014    Veige et al.

FOREIGN PATENT DOCUMENTS

WO    WO-2015191571 A1 * 12/2015 ............ C08F 30/08

OTHER PUBLICATIONS

International Application No. PCT/US2020/20745, International Preliminary Report on Patentability, mailed Sep. 16, 2021.
(Continued)

*Primary Examiner* — Catherine S Branch
(74) *Attorney, Agent, or Firm* — MARSHALL, GERSTEIN & BORUN LLP

(57) ABSTRACT

Provided herein are complexes for polymerization of linear alkynes to cyclic poly(alkynes), and methods of making and using same. For example, provided herein are compounds of formula (I) or formula (IV):

(Continued)

-continued

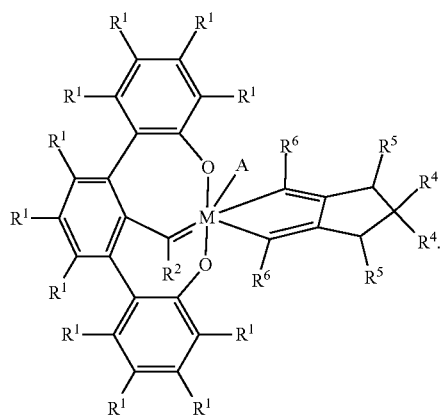
(IV)

20 Claims, 2 Drawing Sheets

(56) References Cited

OTHER PUBLICATIONS

International Application No. PCT/US2020/20745, International Search Report and Written Opinion, mailed Jun. 8, 2020.
Mcgowan et al., Compelling mechanistic data and identification of the active species in tungsten-catalyzed alkyne polymerizations: conversion of a trianionic pincer into a new tetraanionic pincer-type ligand, Chem. Sci., 4(3): 1145-1155 (2013).
Roland et al., Cyclic Polymers from Alkynes Using Group (VI) Catalysts, Doctoral Thesis, University of Florida, 1-18 (2017).
Sarkar et al., An OCO3—trianionic pincer tungsten(VI) alkylidyne: rational design of a highly active alkyne polymerization catalyst, J. Am. Chem. Soc., 134(10):4509-4512 (2012).

* cited by examiner

METALLACYCLOPENTADIENE INITIATORS FOR CYCLIC POLYMER SYNTHESIS FROM ALKYNES

CROSS-REFERENCE TO RELATED APPLICATIONS

This application is a U.S. national phase application of International Patent Application No. PCT/US20/20745, filed Mar. 3, 2020, which claims priority to U.S. Provisional Application No. 62/813,225, filed on Mar. 4, 2019, the entire contents of each are incorporated herein by reference.

STATEMENT REGARDING FEDERALLY SPONSORED RESEARCH OR DEVELOPMENT

This invention was made with U.S. government support under 1565654 awarded by the National Science Foundation. The U.S. government has certain rights in the invention.

BACKGROUND

An important challenge in modern polymer chemistry is the efficient and controlled synthesis of polymers with unique topologies. Perhaps the simplest shape change is to convert a linear polymer into its cyclic analogue. By simply tying together the chain ends of a linear polymer it is possible to dramatically alter its physical properties. The repeat unit, functional groups, molecular weight (minus end groups), and polydispersity all remain the same when the chain ends are removed to create a cyclic polymer; however, the density, refractive index, $T_g$, viscoelasticity, reptation, and surface properties all change.

A common method for the synthesis of cyclic polymers involves intramolecular coupling of polymer chain ends; however, inherent limitations of this method are the requirement of dilute conditions and long reaction times. Ring closing methods continue to improve and provide an opportunity to obtain samples of unique ring-shaped polymers, though large scale production via ring closure is unlikely.

Metal complexes that polymerize alkynes by ring expansion metathesis polymerization (REMP) to yield cyclic polyalkenes are desirable.

SUMMARY

Provided herein are compounds having a structure represented by formula (I) or formula (IV):

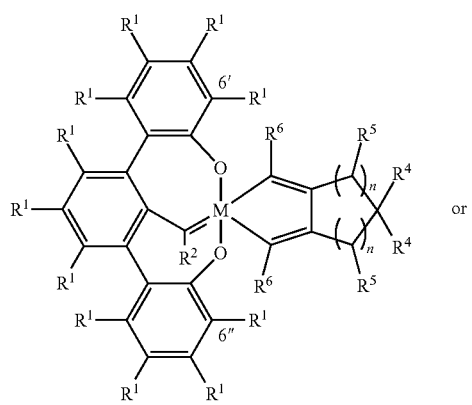

(I)

or

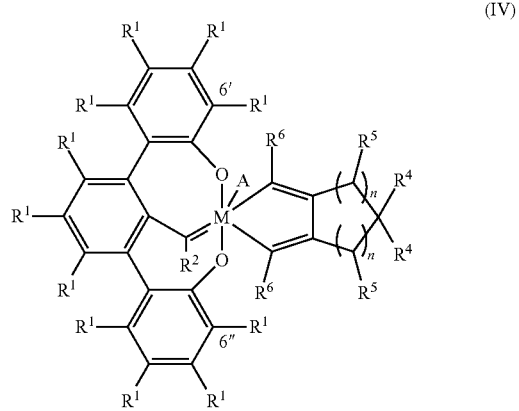

(IV)

wherein M is a transition metal, each $R^1$ is independently H, $C_1$-$C_{20}$ alkyl, carboxyl, ester, amine, thiol, halo, $C_1$-$C_{22}$ haloalkyl, OH, or two adjacent $R^1$, together with the carbon atoms to which they are attached, form a five- to eight-member cyclic group; $R^2$ is selected from $Ar^1$, $C_1$-$C_{22}$ alkyl, halo, $C_1$-$C_{22}$ haloalkyl, hydrogen, —$NH_2$, —N—($C_1$-$C_{22}$ alkyl)$_2$, —NH($C_1$-$C_{22}$ alkyl), —NHAr$^1$, —NAr$^1_2$, —O—Ar$^1$, —O—($C_1$-$C_{22}$ alkyl), and $(R^3)_3$—Si—; each $R^4$ is independently $C_1$-$C_{22}$ alkyl or both $R^4$ together with the carbon atom to which they are attached form a spiro five- to eight-member monocyclic group or a spiro eleven- to thirty-member polycyclic group; each $R^5$ is independently H, $C_1$-$C_{22}$ alkyl, —$NH_2$, —N—($C_1$-$C_{22}$ alkyl)$_2$, —NH($C_1$-$C_{22}$ alkyl), —OH, or —O—($C_1$-$C_{22}$ alkyl); each n is independently 1, 2, 3, 4, or 5; each $R^6$ is independently H, $C_1$-$C_3$ alkyl, halide, —$NH_2$, —N—($C_1$-$C_3$ alkyl)$_2$, —NH($C_1$-$C_3$ alkyl), —NHAr$^1$, —NAr$^1_2$, —O—Ar$^1$, —O—($C_1$-$C_3$ alkyl), —S—Ar$^1$, —S—($C_1$-$C_3$ alkyl); each $R^3$ is independently selected from $C_1$-$C_{22}$ alkyl, $Ar^1$, —O—($C_1$-$C_{22}$ alkyl), —O—Ar$^1$, —N—($C_1$-$C_{22}$ alkyl)$_2$, —NH—($C_1$-$C_{22}$ alkyl), —$NH_2$, —NH—Ar$^1$; —NAr$^1_2$, A is selected from the group consisting of $NH_3$, $N(R^7)_3$, $Ar^2$, $C_1$-$C_6$ hydroxyalkyl, $R^7OR^7$, $P(R^7)_3$, $R^7CHO$, $R^7COR^7$, $R^7COOR^7$, and $S(R^7)_2$, each $Ar^1$ and $Ar^2$ is independently an aryl or heteroaryl comprising 1 to 3 heteroatoms selected from O, N, and S, and each $R^7$ is independently $C_1$-$C_{22}$ alkyl or $Ar^2$, or two $R^7$, together with the atoms to which they are attached, form a five- to eight-member heterocycle.

Also provided herein are methods for making the compounds having a structure represented by formula (I), or formula (IV), or a mixture thereof comprising reacting a complex of formula (II) and a dialkyne having a structure of formula (III) under conditions sufficient to form the compound having a structure represented by formula (I) or formula (IV), or mixture thereof:

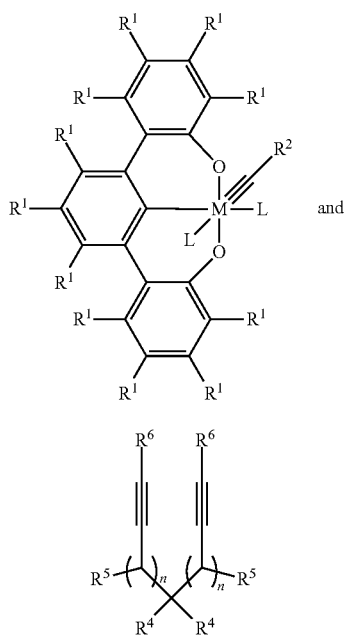

wherein each L is independently either absent or selected from phosphine, phosphite, phosphonite, phosphinite, amine, amide, imine, alkoxy, ether, thioether, and a five- or six-membered monocyclic group having 1 to 3 ring heteroatoms; or both L together comprise a bidentate ligand.

Further provided herein are methods of preparing a cyclic polymer, comprising admixing a plurality of alkynes in the presence of the compound having a structure according to formula (I) or formula (IV), or mixture thereof under conditions sufficient to polymerize the plurality of alkynes, thereby forming a cyclic polymer from the plurality of alkynes, wherein the cyclic polymer ring comprises alkene groups.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION

Figure 1:
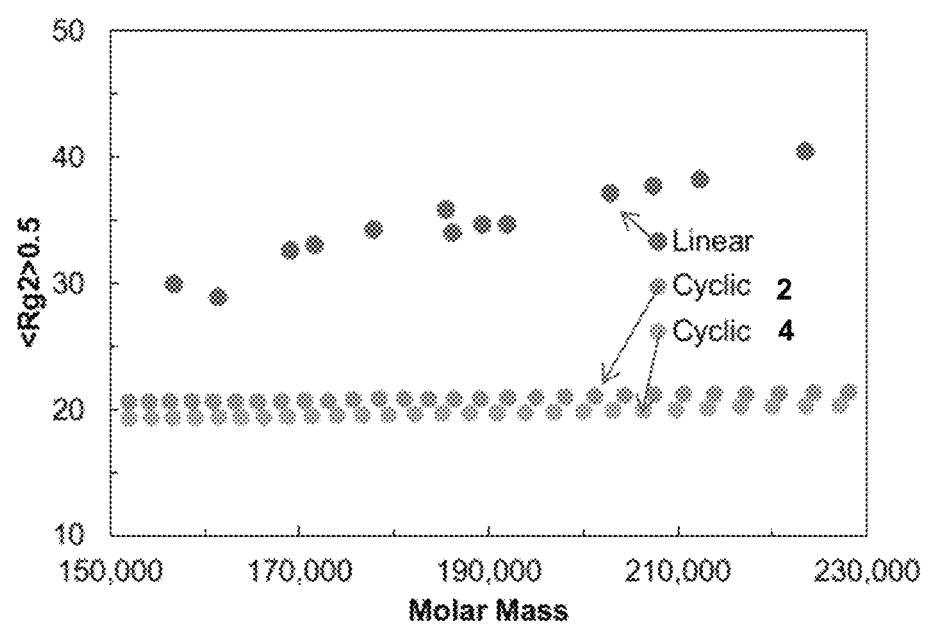
FIG. 1 shows a comparison of the root mean square radius of gyration for known linear polyphenylacetylene (top dots), cyclic polyphenylacetylene prepared with catalyst (2) (middle dots), and cyclic polyphenylacetylene prepared with catalyst (4) (bottom dots).

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Definitions

As used herein, the term "alkyl" refers to straight chained and branched saturated hydrocarbon groups containing one to thirty carbon atoms, for example, one to twenty two carbon atoms, or one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$alkyl and $C_1$-$C_7$ alkyl refer to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Nonlimiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group. The term "alkylene" refers to an alkyl group that is further substituted, e.g., alkylene-aryl refers to an alkyl group having an aryl substituent.

As used herein, the term "cycloalkyl" refers to an aliphatic cyclic hydrocarbon group containing three to eight carbon atoms (e.g., 3, 4, 5, 6, 7, or 8 carbon atoms). The term $C_n$ means the cycloalkyl group has "n" carbon atoms. For example, $C_5$ cycloalkyl refers to a cycloalkyl group that has 5 carbon atoms in the ring. $C_{5-8}$ cycloalkyl and $C_5$-$C_8$ cycloalkyl refer to cycloalkyl groups having a number of carbon atoms encompassing the entire range (i.e., 5 to 8 carbon atoms), as well as all subgroups (e.g., 5-6, 6-8, 5-7, 5, 6, 7, and 8 carbon atoms). Nonlimiting examples of cycloalkyl groups include cyclopropyl, cyclobutyl, cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group.

As used herein, the term "heterocycloalkyl" is defined similarly as cycloalkyl, except the ring contains one to three heteroatoms independently selected from oxygen, nitrogen, and sulfur. In particular, the term "heterocycloalkyl" refers to a ring containing a total of three to eight atoms, of which 1, 2, 3 or three of those atoms are heteroatoms independently selected from the group consisting of oxygen, nitrogen, and sulfur, and the remaining atoms in the ring are carbon atoms. Nonlimiting examples of heterocycloalkyl groups include piperdine, tetrahydrofuran, tetrahydropyran, dihydrofuran, morpholine, and the like. Heterocycloalkyl groups can be saturated or partially unsaturated ring systems optionally substituted with, for example, one to three groups, independently selected alkyl, alkenyl, OH, C(O)NH$_2$, NH$_2$, oxo (=O), aryl, haloalkyl, halo, and OH. Heterocycloalkyl groups optionally can be further N-substituted with alkyl, hydroxyalkyl, alkylene-aryl, and alkylene-heteroaryl. The heterocycloalkyl groups described herein can be isolated or fused to another heterocycloalkyl group, a cycloalkyl group, an aryl group, and/or a heteroaryl group. When a heterocycloalkyl group is fused to another heterocycloalkyl group, then each of the heterocycloalkyl groups can contain three to eight total ring atoms, and one to three heteroatoms. In some embodiments, the heterocycloalkyl groups described herein comprise one oxygen ring atom (e.g., oxiranyl, oxetanyl, tetrahydrofuranyl, and tetrahydropyranyl).

As used herein, the term "aryl" refers to monocyclic or polycyclic (e.g., fused bicyclic and fused tricyclic) carbocyclic aromatic ring systems. Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

As used herein, the term "heteroaryl" refers to a cyclic aromatic ring having five to twelve total ring atoms (e.g., a monocyclic aromatic ring with 5-6 total ring atoms), and containing one to three heteroatoms selected from nitrogen, oxygen, and sulfur in the aromatic ring. Unless otherwise indicated, a heteroaryl group can be unsubstituted or substituted with one or more, and in particular one to four, substituents selected from, for example, halo, alkyl, alkenyl, OCF$_3$, NO$_2$, CN, NC, OH, alkoxy, amino, CO$_2$H, CO$_2$alkyl, aryl, and heteroaryl. In some cases, the heteroaryl group is substituted with one or more of alkyl and alkoxy groups. Heteroaryl groups can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, furyl, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl group is fused to another heteroaryl group, then each ring can contain five or six total ring atoms and one to three heteroatoms in its aromatic ring.

As used herein, the term "cyclic group" refers to any ring structure comprising a cycloalkyl, heterocycloalkyl, aryl, heteroaryl, or a combination thereof. Unless otherwise indicated, a cyclic group can be an unsubstituted or a substituted cyclic group.

As used herein, the term "hydroxy" or "hydroxyl" refers to the "—OH" group. As used herein, the term "thiol" refers to the "—SH" group.

As used herein, the term "alkoxy" or "alkoxyl" refers to a "—O-alkyl" group. As used herein, the term "aryloxy" or "aryloxyl" refers to a "—O-aryl" group. As used herein, the term "ether" refers to an "alkyl-O-alkyl" group. The alkyl groups can together form a ring. A C$_2$-C$_{22}$ ether refers to an ether group wherein both alkyl groups together, or a ring formed therefrom have 2 to 22 carbons. When provided as a ligand, the ether can be coordinated to the metal center through the oxygen. As used herein, the term "thioether" is defined similarly to "ether" except the oxygen atom is replaced with a sulfur atom.

As used herein, the term "halo" is defined as fluoro, chloro, bromo, and iodo. The term "haloalkyl" refers to an alkyl group that is substituted with at least one halogen, and includes perhalogenated alkyl (i.e., all hydrogen atoms substituted with halogen).

As used herein, the term "carboxy" or "carboxyl" refers to a "—COOH" group.

As used herein, the term "amino" refers to a —NH$_2$ group, wherein one or both hydrogen can be replaced with an alkyl, cycloalkyl, or aryl group. As used herein, the term "amido" refers to an amino group that is substituted with a carbonyl moiety (e.g., —NRC(=O)— or —OC(=O)—NR—), wherein R is a substituent on the nitrogen (e.g., alkyl or H). When referring to a ligand, the term "amine" refers to a —NH$_3$ group, where one, two, or three hydrogen can be replaced with an alkyl, cycloalkyl, or aryl group. When referring to a ligand, the term "amide" refers to a NR$_2$ group, wherein each R is independently a hydrogen, alkyl, cycloalkyl, or aryl group. As used herein "imine" refers to a —N(R)=CR$_2$ group, wherein each R is independently an alkyl, cycloalkyl, or aryl group.

As used herein, the term "phosphine" refers to a —PH$_3$ group, wherein one, two or three hydrogen can be replaced with an alkyl, cycloalkyl, or aryl group. As used herein "phosphite" refers to a —P(OR)$_3$ group, wherein each R can individually be alkyl, cycloalkyl, or aryl. As used herein, "phosphonite" refers to a —PR(OR)$_2$ group, wherein each R can individually be alkyl, cycloalkyl, or aryl. As used herein, "phosphinite" refers to a —PR$_2$(OR) group, wherein each R can individually be alkyl, cycloalkyl, or aryl.

As used herein, the term "ester" refers to a —C(=O)OR group, wherein R is a substituent on the oxygen (e.g., alkyl or aryl).

As used herein, the term "substituted," when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms.

Compounds of the Disclosure

Provided herein are compounds having a structure represented by formula (I) or formula (IV):

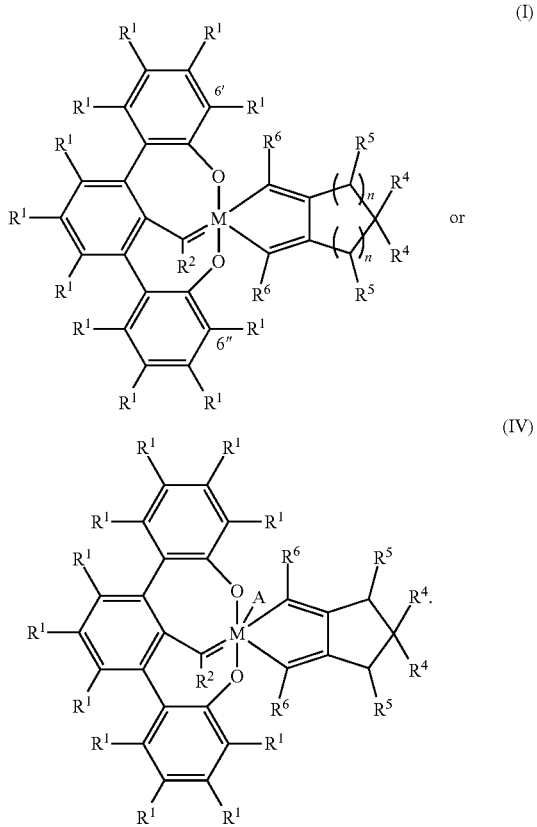

In general, M is a transition metal. In embodiments, M comprises a group 6 transition metal. In embodiments, M comprises molybdenum (Mo) or tungsten (W). In embodiments, M comprises tungsten (W).

In general, each occurrence of $R^1$ independently is independently H, $C_1$-$C_{20}$ alkyl, carboxyl, ester, amino, thiol, halo, $C_1$-$C_{22}$ haloalkyl, OH, or two adjacent $R^1$, together with the carbon atoms to which they are attached, form a five- to eight-member cyclic group. In some cases, each $R^1$ can be H or an alkyl group such as methyl, ethyl, n-propyl, i-propyl, n-butyl, i-butyl, t-butyl, or larger alkyl group, for example $C_5$ to $C_{20}$ alkyl. In some embodiments, $R^1$ can be selected from $C_1$ to $C_6$ alkyl. In some embodiments, two adjacent $R^1$, together with the carbon atoms to which they are attached, can form a five- to eight-member cyclic group for example, cyclopentane, cyclohexane, cycloheptane, cyclooctane, cyclopentene, cyclopentadiene, cyclohexene, cyclohexadiene, cyclohexatriene (benzene), cycloheptene, cycloheptadiene, cycloheptatriene, cyclooctene, cyclooctadiene, cyclooctatriene, and cyclooctatetraene (annulene). In embodiments wherein two adjacent $R^1$ are linked to form a five- to eight-member cyclic group, one or more of the atoms of the cyclic group can be a heteroatom selected from oxygen, nitrogen, and sulfur. In embodiments, no $R^1$ comprises a carboxyl, ester, thiol, or hydroxy. Without intending to be bound by theory, it is believed that bulky $R^1$ groups at carbons 6' and 6" of the ligand can force the aromatic rings of the ligand to be out of plane to a significant degree and thereby inhibit the formation of the ligand-metal complex.

In embodiments, at least one $R^1$ comprises a $C_1$-$C_6$ alkyl. In refinements of the foregoing embodiment, the at least one $R^1$ comprises t-butyl. In embodiments, at least two $R^1$ comprise a $C_1$-$C_6$ alkyl. In refinements of the foregoing embodiment, the at least two $R^1$ comprise t-butyl. In refinements of the foregoing embodiment, the $R^1$ at the 6' carbon and the $R^1$ at the 6" carbon each comprise t-butyl. In embodiments, two adjacent $R^1$ together with the carbon atoms to which they are attached form a five- to eight-member cyclic group.

$R^2$ is generally selected from $Ar^1$, $C_1$-$C_{22}$ alkyl, halo, $C_1$-$C_{22}$ haloalkyl, hydrogen, —$NH_2$, —N—($C_1$-$C_{22}$ alkyl)$_2$, —NH($C_1$-$C_{22}$ alkyl), —NHAr$^1$, —NAr$^1{}_2$, —O—Ar$^1$, —O—($C_1$-$C_{22}$ alkyl), and $(R^3)_3$—Si—. In general, $Ar^1$ is a $C_6$-$C_{22}$ aryl or 5-12 membered heteroaryl group comprising 1 to 3 heteroatoms selected from O, N, and S. In some cases, $Ar^1$ comprises pyrrolyl, furanyl, thiophenyl, imidazolyl, pyrazolyl, oxazolyl, isoxazolyl, thiazolyl, phenyl, pyridinyl, pyrazinyl, pyrimidinyl, pyridazinyl, or triazinyl. $Ar^1$ can also be a fused aryl or heteroaryl group, including, but not limited to, benzofuranyl, isobenzofuranyl, indolyl, isoindolyl, benzothiophenyl, bensimidazolyl, purinyl, indazolyl, benzoxazolyl, benzisoxazolyl, benzothiazolyl, naphthalenyl, anthracenyl, quinolinyl, isoquinolinyl, quinoxalinyl, acridinyl, quinazolinyl, cinnolinyl, and phthalazinyl.

When $R^2$ is alkyl, haloalkyl, or alkoxy, the alkyl chain can be straight or branched. The alkyl chain can optionally further be substituted by, for example, $Ar^1$, halo, amino, alkoxy, ether, and $(R^3)_3$—Si—. In embodiments, $R^2$ is tert-butyl.

Suitable amino groups for $R^2$ include, but are not limited to, $NH_2$ and $C_1$-$C_4$ dialkyl amino, wherein each alkyl group can be the same (e.g., dimethyl amino, diethyl amino, dipropyl amino, dibutyl amino), or different (e.g., methylethyl amino, methylpropyl amino, methylbutyl amino, ethylpropyl amino, ethylbutyl amino, and propylbutyl amino).

$R^2$ can generally be an electron withdrawing substituent or electron donating substituent. Without intending to be bound by theory, it is believed that the electron withdrawing or donating abilities of $R^2$ can affect the rate of the initiation and propagation of polymerization, for example, under otherwise identical reaction conditions, as the electron donating ability of $R^2$ increases, the rates generally increase, whereas as the electron donating ability of $R^2$ decreases (and electron withdrawing ability increases), the rates generally decrease. Similarly, without intending to be bound by theory, it is believed that the rate of initiation is influenced by the presence or absence of a heteroatom adjacent to the carbon-carbon triple bond of the alkyne used to prepare the complex having a structure according to formula (II) described herein. Further still, without intending to be bound by theory, it is believed that the rate of initiation and propagation of polymerization can be influenced by the steric properties of $R^2$, for example, as $R^2$ becomes increasingly sterically bulky, $R^2$ can hinder the approach of the monomer to the metal center.

In embodiments, $R^2$ is selected from methyl, ethyl, propyl, butyl, pentyl, hexyl, naphthyl, and $C_6$-$C_{22}$ aryl. In embodiments, $R^2$ is selected from i-butyl; n-butyl; s-butyl; and t-butyl. In embodiments, $R^2$ is t-butyl. In embodiments, $R^2$ is $C_6$-$C_{22}$ aryl. In embodiments, $R^2$ is halo. In embodiments, $R^2$ is $C_1$-$C_{22}$ haloalkyl. In embodiments, $R^2$ is H. In embodiments, $R^2$ is —$NH_2$. In embodiments, $R^2$ is —NH($C_1$-$C_{22}$ alkyl). In embodiments, $R^2$ is —N($C_1$-$C_{22}$ alkyl)$_2$.

In embodiments, $R^2$ is $C_1$-$C_{22}$—O—($C_1$-$C_{22}$ alkyl). In embodiments, $R^2$ is $(R^3)_3$—Si—.

Each occurrence of $R^3$ is independently selected from $C_1$-$C_{22}$ alkyl, $Ar^1$, —O—($C_1$-$C_{22}$ alkyl), —O—$Ar^1$, —NH—($C_1$-$C_{22}$ alkyl), —N—($C_1$-$C_{22}$ alkyl)$_2$, —NH$Ar^1$, or —N—$Ar^1{}_2$.

In general, each $R^4$ is independently $C_1$-$C_{22}$ alkyl or both $R^4$ together with the carbon atom to which they are attached form a spiro five- to eight-member monocyclic group or a spiro eleven- to thirty-member polycyclic group, for example, cyclopentane, cyclohexane, cycloheptane, cyclooctane, cyclopentene, cyclopentadiene, cyclohexene, cyclohexadiene, cyclohexatriene (benzene), cycloheptene, cycloheptadiene, cycloheptatriene, cyclooctene, cyclooctadiene, cyclooctatriene, and cyclooctatetraene (annulene), fluorenyl, pyrrolyl, furanyl, thiophenyl, imidazolyl, pyrazolyl, oxazolyl, isoxazolyl, thiazolyl, phenyl, pyridinyl, pyrazinyl, pyrimidinyl, pyridazinyl, or triazinyl, benzofuranyl, isobenzofuranyl, indolyl, isoindolyl, benzothiophenyl, bensimidazolyl, purinyl, indazolyl, benzoxazolyl, benzisoxazolyl, benzothiazolyl, maphthalenyl, anthracenyl, quinolinyl, isoquinolinyl, quinoxalinyl, acridinyl, quinazolinyl, cinnolinyl, and phthalazinyl. In embodiments wherein both $R^4$ are linked to form a five- to eight-member cyclic group, one or more of the atoms of the cyclic group can be a heteroatom selected from oxygen, nitrogen, and sulfur. In embodiments, each $R^4$ comprises $C_1$-$C_{22}$ alkyl. In embodiments, at least one $R^4$ is methyl. In embodiments, both $R^4$ are methyl. In embodiments, at least one $R^4$ is t-butyl. In embodiments, both $R^4$ are t-butyl. In embodiments, one $R^4$ is methyl and one $R^4$ is t-butyl.

In embodiments, both $R^4$ together with the carbon atom to which they are attached form a spiro five- to eight-member monocyclic group. In embodiments, both $R^4$ together with the carbon atom to which they are attached for a spiro cyclopentyl group. In embodiments, both $R^4$ together with the carbon atom to which they are attached for a spiro eleven- to thirty-member polycyclic group. In embodiments, both $R^4$ together with the carbon atom to which they are attached form a fluorenyl group.

In general, each $R^5$ can independently be H, $C_1$-$C_{22}$ alkyl, —NH$_2$, —NH($C_1$-$C_{22}$ alkyl), —N($C_1$-$C_{22}$ alkyl)$_2$, —NH$Ar^1$, —N$Ar^1{}_2$, —O—$Ar^1$, —OH, or —O—($C_1$-$C_{22}$ alkyl). In embodiments, at least one $R^5$ is hydrogen. In embodiments, each $R^5$ is hydrogen. In embodiments, at least one $R^5$ is $C_1$-$C_{22}$ alkyl. In embodiments, at least one $R^5$ is —NH$_2$. In embodiments, at least one $R^5$ is —NH($C_1$-$C_{22}$ alkyl). In embodiments, at least one $R^5$ is —N($C_1$-$C_{22}$ alkyl)$_2$. In embodiments, at least one $R^5$ is —OH. In embodiments, at least one $R^5$ is or —O—($C_1$-$C_{22}$ alkyl). In embodiments, at least one $R^5$ is —NH$Ar^1$. In embodiments, at least one $R^5$ is —N$Ar^1{}_2$. In embodiments, at least one $R^5$ is —O—$Ar^1$.

In general, each occurrence of n is independently 1, 2, 3, 4, or 5. Without intending to be bound by theory, it is believed that close proximity of the alkyne functional groups to each other promotes intramolecular insertion of the compound having a structure according to formula (III) at the metal center of the complex having a structure according to formula (II), to form the metallacyclopentadiene. Thus, in embodiments, both n are the same. In refinements of the foregoing embodiment, each n is 1. In embodiments, each n is different. For example, each n can be selected such that one n is 1 and the second n is 2, one n is 1 and the second n is 3, one n is 1 and the second n is 4, one n is 1 and the second n is 5, one n is 2 and the second n is 3, one n is 2 and the second n is 4, one n is 2 and the second n is 5, one n is 3 and the second n is 4, one n is 3 and the second n is 5, or one n is 4 and the second n is 5. Without intending to be bound by theory, it is believed that when n is larger than 5, the intramolecular insertion of the compound having a structure according to formula (III) at the metal center of the complex having a structure according to formula (II) may only result under very dilute conditions.

In general, each $R^6$ can independently be H, $C_1$-$C_3$ alkyl, halide, —NH$_2$, —N—($C_1$-$C_3$ alkyl)$_2$, —NH($C_1$-$C_3$ alkyl), —NH$Ar^1$, —N$Ar^1{}_2$, —O—$Ar^1$, —O—($C_1$-$C_3$ alkyl), —S—$Ar^1$, —S—($C_1$-$C_3$ alkyl). In embodiments, at least one $R^6$ is H. In embodiments, each $R^6$ is H. In embodiments, at least one $R^6$ is selected from methyl, ethyl, and i-propyl. Without intending to be bound by theory, it is believed that the rate of initiation and propagation of polymerization will be influenced by the steric properties of $R^6$ such that as the steric bulk of $R^6$ increases, the rate of initiation and propagation of polymerization can decrease due to $R^6$ hindering the approach of the monomer to the metal center. Thus, without intending to be bound by theory, it is believed that, under otherwise identical reaction conditions, a the rate of initiation of polymerization for a complex wherein both $R^6$ are hydrogen will be faster than the rate of initiation of polymerization for a complex wherein one or more $R^6$ comprises an alkyl group.

In general, A can comprise any L-type ligand. L-type ligands are described in detail throughout Gray L. Spessard and Gary L. Miessler, Organometallic Chemistry, published by Oxford University Press, 2010, for example, page 59. In embodiments, A comprises NH$_3$, N($R^7$)$_3$, $Ar^2$, $C_1$-$C_6$ hydroxyalkyl, $R^7$O$R^7$, P($R^7$)$_3$, $R^7$CHO, $R^7$CO$R^7$, $R^7$COO$R^7$, or S($R^7$)$_2$. In embodiments, A comprises N($R^7$)$_3$, P($R^7$)$_3$, $Ar^2$, S($R^7$)$_2$ or $R^7$O$R^7$. In some cases, A is selected from the group consisting of diethyl ether, methyl tert-butyl ether (MTBE), diisopropyl ether, tetrahydrofuran (THF), dioxane and the like. In embodiments, A comprises pyridine or a derivative thereof, such as, N,N-dimethylaminopyridine. In embodiments, A comprises tetrahydrofuran or a substituted version thereof (e.g., substituted with 1-3 $C_{1-6}$alkyl groups), pyridine or a derivative thereof, or thiophene or a substituted version thereof (e.g., substituted with 1-3 groups selected from $C_{1-6}$alkyl, halo, CN, and $C_{1-6}$haloalkyl). In embodiments, A is THF.

In embodiments, the compound having a structure represented by formula (I) is in equilibrium with the compound having a structure represented by formula (IV).

Each occurrence of $R^7$ is independently selected from $C_1$-$C_{22}$ alkyl, $C_5$-$C_8$ cycloalkyl, or $Ar^2$, or two $R^3$, together with the atoms to which they are attached, form a five- to eight-member heterocycle.

Each occurrence of $Ar^1$ and $Ar^2$ can be independently selected from $C_6$-$C_{22}$aryl or a 5-12 membered heteroaryl comprising from 1 to 3 ring heteroatoms selected from O, N, and S.

In some embodiments, the compound s disclosed herein is selected from the group consisting of

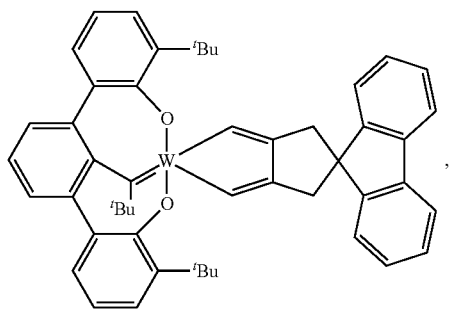

,

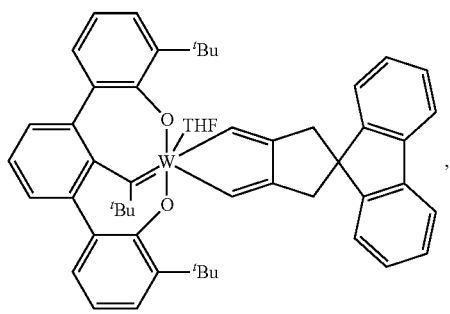

,

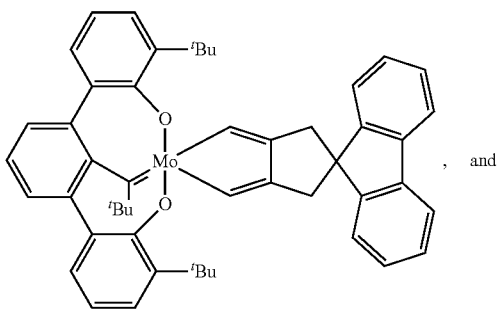

, and

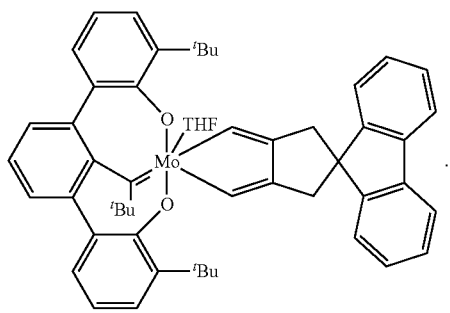

.

Methods of Making Compounds of the Disclosure

Further provided herein are methods for making the compound having a structure represented by formula (I), formula (IV), or a mixture thereof, comprising reacting a complex of formula (II) and a dialkyne having a structure of formula (III) under conditions sufficient to form the compound having a structure represented by formula (I), formula (IV), or a mixture thereof:

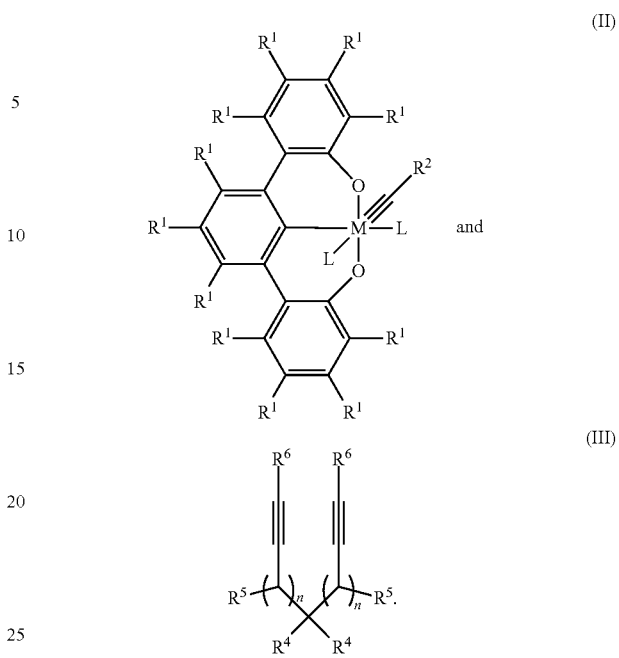

In general, each L independently can be absent or selected from phosphine, phosphite, phosphonite, phosphinite, amine, amide, imine, alkoxy, ether, thioether, and a five- or six-membered monocyclic group having 1 to 3 ring heteroatoms. Suitable bidentate ligands include, but are not limited to, bipyridine, ethylenediamine, diaminocyclohexane, acetylacetonate, oxalate, and phenanthroline.

L can be absent or a weakly coordinating electron donor ligand, including, but not limited to, phosphine, phosphite, phosphinite, phosphonite, ether, thioether, amine, amide, imine, and five- or six-membered monocyclic groups containing 1 to 3 heteroatoms. The five- or six-membered monocyclic groups can include 1 to 3 heteroatom or 1 to 2 heteroatoms, for example, pyridine, pyridazine, pyrimidine, pyrazine, triazine, pyrrole, pyrazole, imidazoletriazole, pyran, pyrone, dioxin, and furan. The five- or six-membered monocyclic groups can be substituted with halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_2$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, including but not limited to, $C_1$-$C_{20}$ alkoxy, $C_5$-$C_{24}$ aryloxy, $C_2$-$C_{20}$ alkylcarbonyl, $C_6$-$C_{24}$ arylcarbonyl, carboxy, carboxylate, carbamoyl, carbamido, formyl, thioformyl, amino, nitro, and nitroso.

Phosphine and amine ligands can include primary, secondary, and tertiary phosphines and amines. The phosphine and amine ligands can include 0 to 3 alkyl groups, 1 to 3 alkyl groups, or 1 to 2 alkyl groups selected from $C_1$-$C_{20}$ alkyl. The phosphine and amine ligands can also include 0 to 3 aryl or heteroaryl groups, 1 to 3 aryl or heteroaryl groups, or 1 to 2 aryl or heteroaryl groups selected from five- and six-membered aryl or heteroaryl rings.

In embodiments, at least one L is absent. In embodiments wherein L is absent, the complex of formula (II) is coordinatively unsaturated. In embodiments, at least one L is a phosphine. In embodiments, at least one L is an amine. In refinements of the foregoing embodiments, at least one L is selected from NH₂, dimethyl amine and diethyl amine. In embodiments, at least one L is an ether. In embodiments at least one L is a five- or six-membered monocyclic group having 1 to 3 ring heteroatoms. In refinements of the foregoing embodiment, at least one L is selected from tetrahydrofuran, tetrahydrothiophene, pyridine, and tetrahydropyran. In some embodiments, both L together comprise a bidentate ligand selected from bipyridine, ethylenediammine, diaminocyclohexane, acetylacetonate, oxalate, and phenanthroline.

In embodiments, the complex of formula (II) is selected from

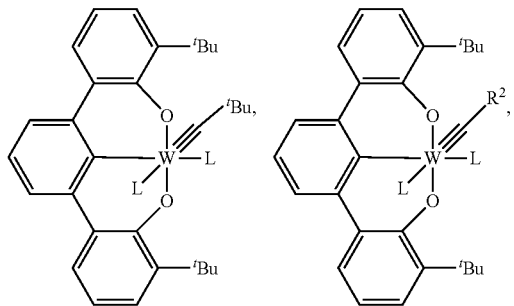

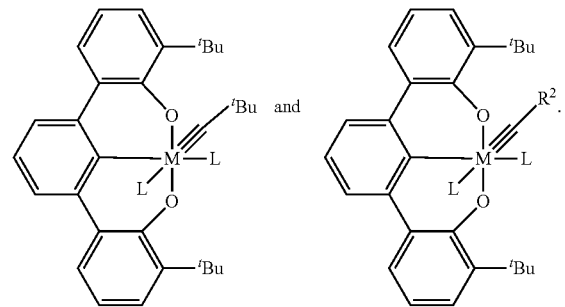

In embodiments, the complex of formula (II) is selected from

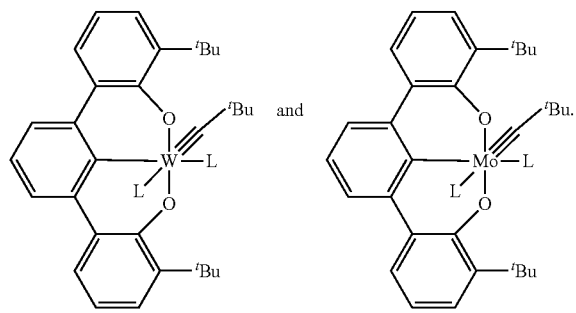

In embodiments, the complex of formula (II) is selected from

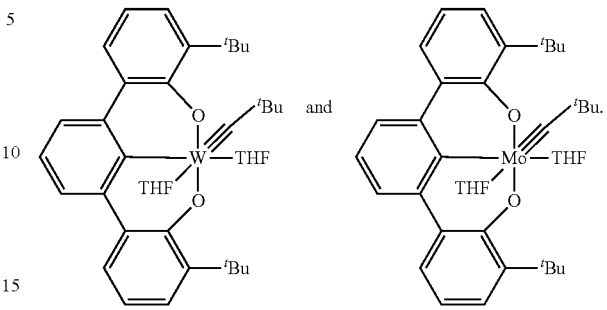

In general, the complex of formula (II) and a dialkyne having a structure of formula (III) can be reacted under conditions sufficient to form the compound having a structure represented by formula (I), formula (IV), or a mixture thereof.

In embodiments, the reaction of the complex of formula (II) and the compound of formula (III) can occur neat (e.g., in the absence of a solvent), in cases when the compound of formula (III) is a liquid. In embodiments, the reaction of the complex of formula (II) and the compound of formula (III) can occur in solution. Suitable solvents include nonpolar aprotic solvents, such as, but not limited to, benzene, toluene, hexanes, pentanes, dichloromethane, trichloromethane, chloro-substituted benzenes, deuterated analogs of the foregoing and combinations of the foregoing. As will be understood by one of ordinary skill in the art, polar aprotic solvents may also be suitable provided they do not compete with the dialkyne to coordinate at the metal center. Suitable polar aprotic solvents can include, but are not limited to, diethyl ether, ethyl acetate, acetone, dimethylformamide, dimethoxyethane, tetrahydrofuran, acetonitrile, dimethyl sulfoxide, nitromethane, propylene carbonate, deuterated analogs of the foregoing, and combinations of the foregoing.

The reaction of the complex of formula (II) and the compound of formula (III) can occur at any suitable temperature for any suitable time. It is well understood in the art that the rate of a reaction can be controlled by tuning the temperature. Thus, in general, as the reaction temperature increases the reaction time can decrease. Without intending to be bound by theory, it is believed that the electron withdrawing or donating abilities of $R^2$ can affect the rate of addition of the compound of formula (III) to the complex of formula (II), for example, under otherwise identical reaction conditions, as the electron donating ability of $R^2$ increases, the rates generally increase, whereas as the electron donating ability of $R^2$ decreases (and electron withdrawing ability increases), the rates generally decrease. Similarly, without intending to be bound by theory, it is believed that the steric bulk of $R^6$ can affect the rate of addition of the compound of formula (III) to the complex of formula (II), for example, under otherwise identical reaction conditions, as the steric bulk of $R^6$ can inhibit the approach of the dialkyne to the metal center. Without intending to be bound by theory, it is believed that close proximity of the germinal dialkynes of the dialkyne can promote addition of the dialkyne to the metal complex. Thus, under otherwise identical reaction conditions, it is believed that a symmetric, short chain dialkyne will react with the metal center at a faster rate than an asymmetric and/or long chain dialkyne. Accordingly, reaction temperature and time can be selected to facilitate addition of the dialkyne to the metal complex.

Reaction temperatures can be in a range of about −80° C. to about 100° C., about −70 to about 80° C., about −50° C. to about 75° C., about −25° C. to about 50° C., about 0° C. to about 35° C., about 5° C. to about 30° C., about 10° C. to about 25° C., about 15° C. to about 25° C., or about 20° C. to about 25° C., for example, about 0° C., about 5° C., about 10° C., about 15° C., about 20° C., about 25° C., about 30° C., or about 35° C. Reaction times can be instantaneous or in a range of about 30 seconds to about 72 h, about 1 min to about 72 h, about 5 min to about 72 h, about 10 min to about 48 h, about 15 min to about 24 h, about 20 min to about 12 h, about 25 min to about 6 h, or about 30 min to about 3 h, for example, 30 seconds, 1 min, 5 min, 10 min, 15 min, 20 min, 25 min, 30 min, 35 min, 40 min, 45 min, 50 min, 55 min, 60 min, 75 min, 90 min, 105 min, 2 h, 3 h, 4 h, 5 h, 6 h, 12 h, 18 h, 24 h, 36 h, 48 h, 60 h, or 72 h.

Methods of Using the Compounds of the Disclosure

The disclosure further provides methods of preparing a cyclic polymer, comprising admixing a plurality of alkynes in the presence of the compound having a structure according to formula (I), formula (IV) or mixture thereof, under conditions sufficient to polymerize the plurality of alkynes, thereby forming a cyclic polymer from the plurality of alkynes, wherein the cyclic polymer ring comprises alkene groups.

Cyclic polymers can be prepared from any compound that includes a carbon-carbon triple bond. In general, suitable alkynes include any alkyne which does not include an acidic proton. A wide variety of alkyne monomers, including, but not limited to, unsubstituted, monosubstituted, or disubstituted alkynes can be used to prepare cyclic polymers. Substituted alkynes can include alkynes substituted with 1 to 3 heteroatoms selected from oxygen, nitrogen, and sulfur. The alkyne monomer can be a cyclic alkyne. The plurality of alkynes polymerized to form a cyclic polymer can have a structure of:

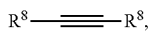

wherein each $R^a$ independently is selected from hydrogen, $C_1$-$C_{22}$ alkyl, and $C_6$-$C_{22}$ aryl. In embodiments, at least one $R^8$ is hydrogen (i.e., a terminal alkyne). In embodiments, each $R^8$ is hydrogen (i.e., the alkyne is acetylene). In embodiments, at least one $R^8$ is methyl. In embodiments, at least one $R^8$ is phenyl. Examples of suitable monomers include, but are not limited to, acetylene, methyl acetylene, ethyl acetylene, phenyl acetylene, diphenyl acetylene, 1-phenyl-1-propyne, 4-fluoro-phenyl acetylene, 4-methoxy-phenyl acetylene. In embodiments, the plurality of alkynes comprises a mixture of different alkynes. In embodiments, the plurality of alkynes comprises the same alkyne.

The polymerization reaction occurs upon combining the complex having a structure according to formula (I) or (IV), or a mixture thereof, with an alkyne monomer, in a fluid state, which can be in solution.

Examples of solvents that may be used in the polymerization reaction include organic, protic, or aqueous solvents that are inert under the polymerization conditions, such as aromatic hydrocarbons, halogenated hydrocarbons, ethers, aliphatic hydrocarbons, alcohols, water, or mixtures thereof. Suitable halogenated hydrocarbon solvents include methylene chloride, chloroform, chlorobenzene, 1,2-dichloroethane, dichlorobenzene, and mixtures thereof.

The polymerization can be carried out at, for example, ambient temperatures at dry conditions under an inert atmosphere. The polymerization can be carried out at a temperature in the range of about 30° C. to about 100° C. or greater, for example, in a range of about 35° C. to about 85° C. or about 40° C. to about 60° C. Polymerization times will vary, depending on the particular monomer, metallacyclopropene complex, and desired molecular weight of the cyclic polymer product. The progress of the reaction can be monitored by standard techniques, e.g., nuclear magnetic resonance (NMR) spectroscopy.

Polymerization proceeds by successive addition/insertion of the monomer to the growing macrocycle on the metal complex, and the intermediate macrocylic complex undergoes intramolecular chain transfer to yield the cyclic olefinic polymer. Polymerization may be terminated at any time by addition of a solvent effective to precipitate the polymer, for example, methanol. A representative cyclic polymer prepared from a monosubstituted alkyne (substituted with $R^8$, where the other $R^8$ of the alkyne monomer is H) has a structure according to formula (V):

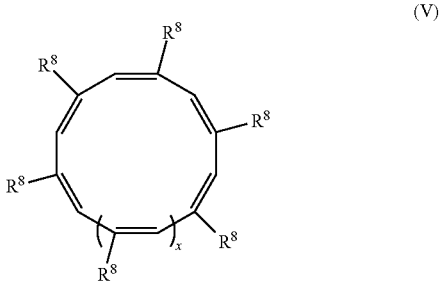

wherein x represents an integer for the monomer units from the alkyne monomer incorporated into the cyclic polymer and depends on the amount of monomer provided and the molecular weight of the polymer at termination. The precipitated polymer may then be isolated by filtration or other conventional means.

The molecular weight of the cyclic polymers can be small, equivalent to oligomers of three to ten repeating units, or the molecular weights can be of any size up to tens and hundreds of thousands or millions in molecular weight, for example, in a range of about 200 Da to about 5,000,000 Da, about 500 Da to about 4,000,000 Da, about 1,000 Da to about 3,000,000 Da, about 5,000 Da to about 2,000,000 Da or about 10,000 to about 1,000,000 Da. The cyclic polyalkenes can be used as prepared or converted into cyclic polyalkanes upon reduction of the double bonds of the cyclic polyalkene polymer. The cyclic polyalkene can be converted to substituted cyclic polyalkanes by addition reaction at the alkene groups of the cyclic polyalkenes, for example the addition of halogens, alcohols, amines, or any other olefin addition reactions.

The poly(alkyne)s prepared by this method can display one or more geometries across the resulting double bonds of the poly(alkyne) backbone. In embodiments, the cyclic polymer is syndiotactic. In embodiments, the alkene groups of the cyclic polymer are at least 50%, at least 60%, at least 70%, at least 80%, or at least 90% cis. In embodiments, the alkene groups of the cyclic polymer are at least 50%, at least 60%, at least 70%, at least 80%, or at least 90% trans. In embodiments, the cyclic polymer is syndiotactic and at least 90% of the alkene groups are cis. In embodiments, the cyclic polymer is syndiotactic and at least 90% of the alkene groups are trans.

Following polymer synthesis and recovery, the olefinic polymer provided may be hydrogenated using conventional means, e.g., via standard $H_2$/Pd/C procedures or via tosylhydrazine decomposition. Generally, either procedure will result in a saturated polymer having hydrogenated more than 99% of the olefinic functionalities in the polymer backbone, as may be determined by $^1H$ and $^{13}C$ NMR spectroscopy. As used herein, a cyclic polymer is fully hydrogenated if more than 99% of the olefinic functionalities are hydrogenated. Advantageously, the stereoregularity of the polymers are maintained during hydrogenation, providing for stereoregular saturated cyclic polymers.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Unless specified otherwise, all manipulations were performed under an inert atmosphere using glove-box techniques. Toluene and pentane were dried using a GlassContour drying column. Phenylacetylene was purchased from Sigma-Aldrich, distilled from magnesium sulfate, degassed by freeze pump thawing, and filtered through a column of basic alumina immediately prior to use. Toluene-$d_8$ was dried over phosphorous pentoxide ($P_2O_5$), distilled, degassed by freeze pump thawing, and stored over 4 angstrom molecular sieves. [$^tBuOCO$]W≡C$^tBu$(THF)$_2$ (1) and [$O_2C(^tBuC=)W(\eta^2$-HC≡Cph)] (2) were prepared according to literature procedure as described in Sarkar, S. et al., *J. Am. Chem. Soc.* 2012, 134, 4509-4512 and McGowan, K. P. et al., *Chem. Sci.* 2013, 4, 1145-1155. NMR spectra were obtained on Varian INOVA 500 MHz and Varian INOVA2 500 MHz spectrometers, or equivalent. Chemical shifts are reported in δ (ppm). For $^1H$ and $^{13}C$ NMR spectra, the residual solvent peaks were used as an internal reference. Molecular weight, radius of gyration and polydispersity were determined by size exclusion chromatography (SEC) in dimethylacetamide (DMAc) with 50 mM LiCl at 50° C. and a flow rate of 1.0 mL/min (Agilent isocratic pump, degasser, and auto-sampler, columns: PLgel 5 μm guard+ two ViscoGel I-series G3078 mixed bed columns: molecular weight range 0-20×10$^3$+ and 0-100×10$^4$ g mol$^{-1}$). Detection consisted of a Wyatt Optilab T-rEX refractive index detector, or equivalent, operating at 658 nm and a Wyatt miniDAWN Treos light scattering detector, or equivalent, operating at 659 nm. Absolute molecular weights and polydispersities were calculated using Wyatt ASTRA software or equivalent.

Example 1: Synthesis of Catalyst (4)

A 20 mL vial equipped with a stir bar was charged with compound (1) (10 mg, 12.9 μmol) and dissolved in minimal (<1 mL) benzene. An aliquot of dipropargylfluorene (3.2 mg, 12.9 μmol) from a stock solution in benzene was added via micropipette. The solution immediately changed color from orange/brown to dark purple upon addition of the dipropargylfluorene. Complex (4) instantaneously formed quantitatively upon addition. Complex (4) was not isolated.

Complex (4) was characterized by $^1H$ and $^{13}C$ NMR. $^1H$ NMR (500 MHz, C$_7$D$_8$, δ (ppm)): 8.87 (s, 1H, H50), 8.75 (s, 1H, H32), 7.61 (d, 2H, H8/H10), 7.61 (d, 2H, H40/H43), 7.54 (d, 2H, H37/H47), 7.46, (t, 2H, H3/H16), 7.39 (t, 1H, H9), 7.26 (t, 2H, H39/H44), 7.25 (d, 2H, H5/H14), 7.17 (t of d, 2H, H38/H45), 6.93 (t, 2H, H4/H15), 2.93 (s, 2H, H48), 2.82 (s, 2H, H34), 1.68 (s, 18H, H20-22/H24-26), 1.01 (s, 9H, H29-31). $^{13}C$ NMR: 305.7 (s, C27), 188.9 (s, 188.1 (s, C50), 168.3 (s, C1/C18), 159.0 (s, C7/C11), 150.1 (s, C36/C47), 140.1 (s, C41/C42), 138.3 (s, C2/C17), 134.9 (s, C9), 134.2 (s, C8/C10), 130.7 (s, C6/C13), 130.2 (s, C49), 129.2 (s, C5/C14), 128.4 (s, 127.7 (s, C38/C45), 127.5 (s, C39/C44), 126.4 (s, C3/C16), 122.9 (s, C37/C46), 119.9 (s, C40/C43), 119.3 (s, C4/C15), 102.3 (s, C12), 51.2 (s, C48), 50.7 (s, C35), 48.6 (s, C34), 46.9 (s, C28), 35.6 (s, C19/C23), 35.0 (s, C29-31), 29.9 (s, C20-22/C24-26).

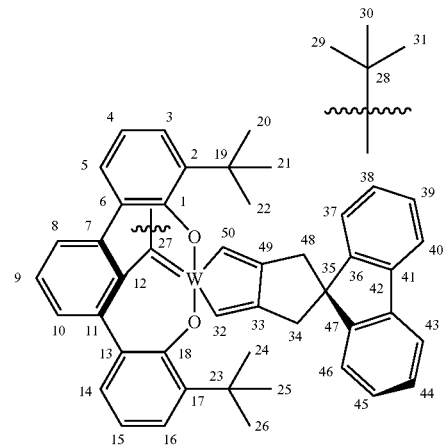

Thus, Example 1 shows preparation of a compound having a structure represented by formula (I) of the disclosure.

Example 2: Synthesis of Equilibrium Mixture of Catalyst (4) and Catalyst (4-THF)

A 20 mL vial equipped with a stir bar was charged with compound 1 (10 mg, 12.9 μmol) and dissolved in minimal (<1 mL) benzene. An aliquot of dipropargylfluorene (3.2 mg, 12.9 μmol) from a stock solution in benzene was added via micropipette. The solution immediately changed color from orange/brown to dark purple upon addition of the dipropargylfluorene. The reaction approaches equilibrium after 5 h.

Complex (4-THF) was characterized by $^1H$ and $^{13}C$ NMR. $^1H$ NMR (500 MHz, C$_7$D$_8$, δ (ppm)): 9.05 (s, 1H, H50), 7.92 (d, $^2J_{HH}$=7.3 Hz, 2H, H37/H46), 7.73 (s, 1H, H32), 7.58 (d, $^2J_{HH}$=7.3 Hz, 2H, H40/H43), 7.42 (dd, $^2J_{HH}$=8.7 Hz, 2.1 Hz, 2H, H3/H16), 7.41 (d, $^2J_{HH}$=7.3 Hz, 2H, H8/H10), 7.35 (td, $^2J_{HH}$=7.3 Hz, 0.9 Hz, 2H, H38/H45), 7.24 (dd, $^2J_{HH}$=7.6 Hz, 1.7 Hz, 2H, H39/H44), 7.24 (dd, $^2J_{HH}$=7.6 Hz, 1.7 Hz, 2H, H5/H14), 7.17 (t, $^2J_{HH}$=7.6 Hz, 1H, H9), 6.88 (t, $^2J_{HH}$=7.5 Hz, 2H, H4/H15), 2.77 (d, $^2J_{HH}$=1.2 Hz, 2H, H48), 2.54 (d, $^2J_{HH}$=1.2 Hz, 2H, H34), 1.80 (s, 18H, H20-22/H24-26), 0.79 (s, 9H, H29-31). $^{13}C$ NMR: 267.1 (C27), 175.8 (C32), 177.3 (C49), 179.6 (C50), 167.6 (C18/C1), 163.7 (C7/C11), 159.4 (C33), 153 (C36/

C47), 139.6 (C41/C42), 138.0 131.0 (C8/C10), 135.0 (C9), 127.8 (C5/C14), 127.5 (C38/C45), 127.0 (C39/C44), 127.0 (C3/C16), 123.8 (C37/C46), 120.2 (C4/C15, 119.6 (C40/C43), 114.1 (C12), 58.4 (C35), 44.1 (C48), 44.0 (C28), 42.7 (C34), 35.4 (C19/C23), 35.4 (C29-C31), 30.7 (C20-22 and C24-26).

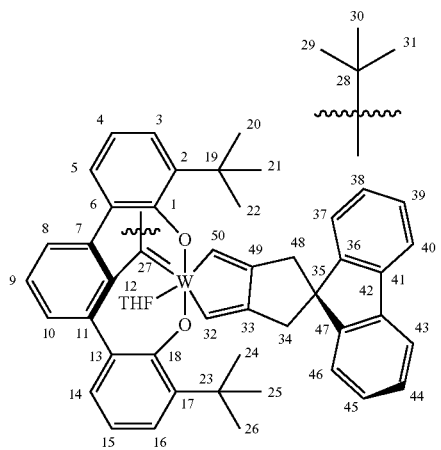

Thus, Example 2 shows preparation of a compound having a structure represented by formula (I) and formula (IV) of the disclosure in equilibrium.

Example 3: Kinetics for the Conversion of Catalyst 4 to 4-THF

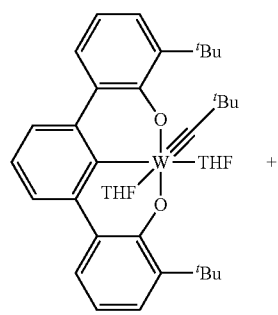

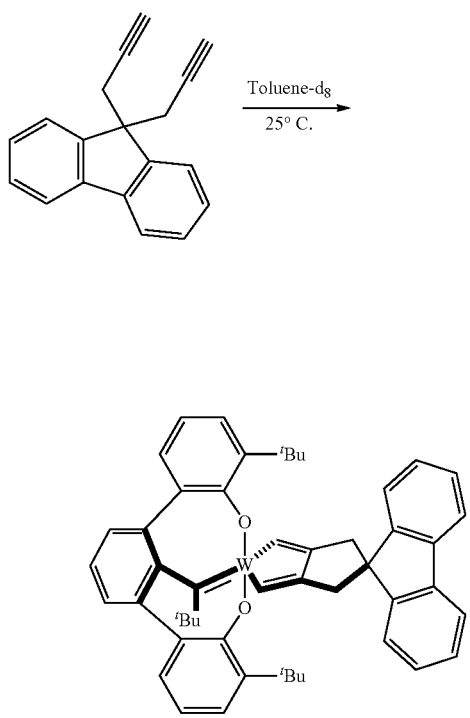

In a nitrogen filled glovebox, a J-Young NMR tube was charged with 300 μL stock solution (0.0333 g/mL in toluene-d8) of complex 3 (0.0100 g, 0.0130 mmol). A 400 μL dipropargylfluorene solution (3.2 mg, 0.0130 mmol, 0.0080 g/mL) was added dropwise into the J-Young tube while shaking the tube. The initial concentration of 3 was $1.857 \times 10^{-2}$ M. Then the tube was taken out of the glovebox for NMR experiments. The NMR spectra were taken at desired time points.

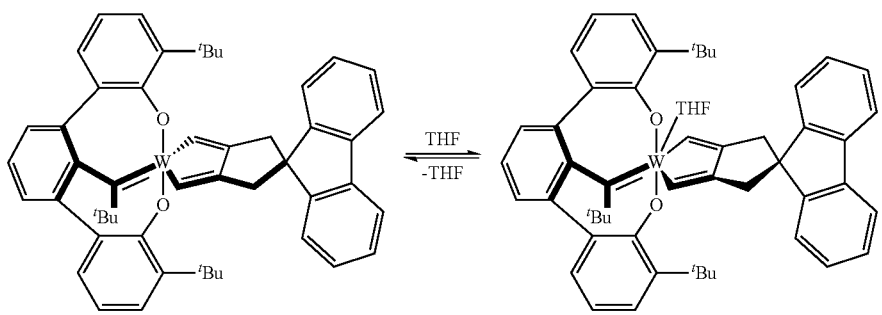

Figure 2:
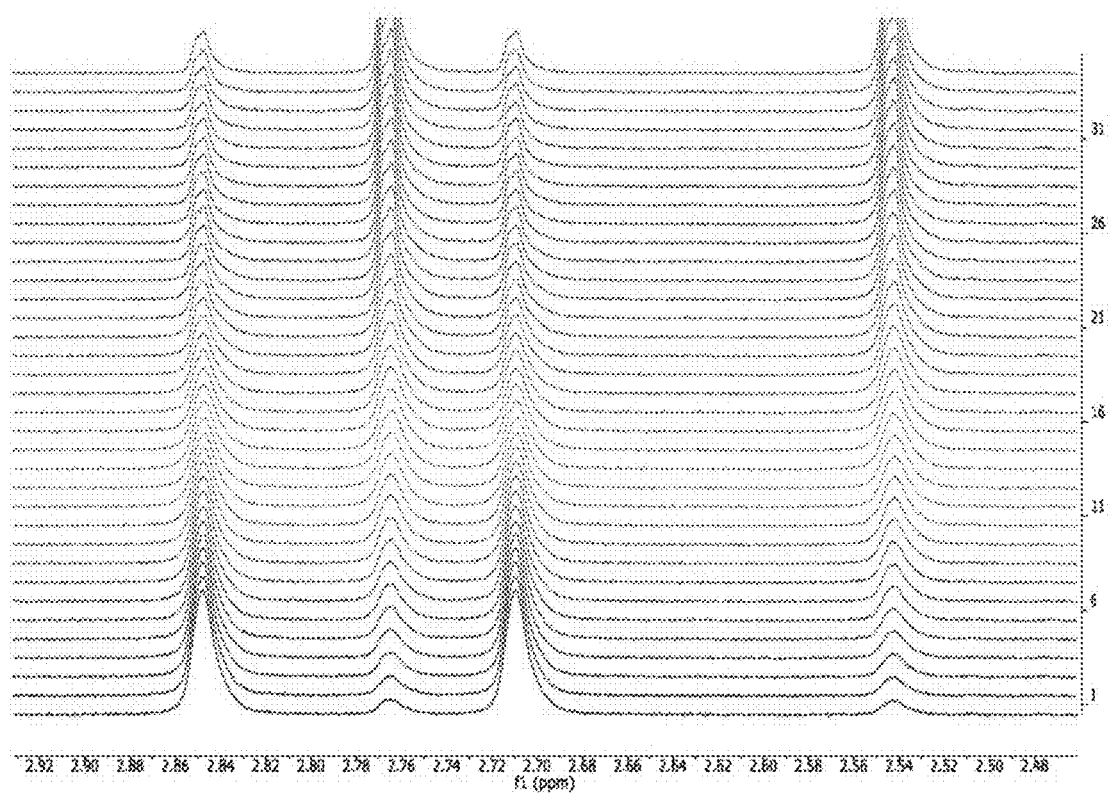
FIG. 2 shows $^1$H NMR spectra of the isomerization of complex 4 to complex 4-THF tracked via $^1$H NMR over time with spectra taken 5 minutes apart; the bottom spectrum was taken at t=15 min. Only the methylene protons for 4 (2.71 and 2.85 ppm) and 4-THF (2.54 and 2.77 ppm) are shown. (Initial concentration of 3=1.857×10$^{-2}$ M; 25° C.).

The conversion of 4 to 4-THF was studied by NMR spectroscopy by tracking the methylene ($CH_2$) groups on the propargyl arms of the fluorene substituent on 4-THF, which resonate at 2.54 and 2.77 ppm. The methylene units on 4 show up as doublets at 2.71 ppm and 2.85 ppm. (FIG. 2).

Integration of the methylene resonances and plotting the equation $\ln [4]/[4]_0 = -kt$ provides rate constant (k) for the conversion of 4 to 4-THF versus time. Using this method, a rate constant of $1.41 (\pm 0.04) \times 10^{-4}$ $s^{-1}$ was obtained for the conversion of 4 to 4-THF. To investigate if tetrahydrofuran (THF) assists the formation of complex 4-THF, another kinetics study with 10-fold excess of THF (with reference to 3) was set up; the rate of the reaction was determined to be $1.64 (\pm 0.15) \times 10^{-4}$ $s^{-1}$ shown in FIG. 2. The similar rate constants indicate the reaction is zero order in THF. However, this result cannot rule out the rapid association and dissociation of THF on complex 4 prior to rate-determining ligand reorganization.

Figure 3:
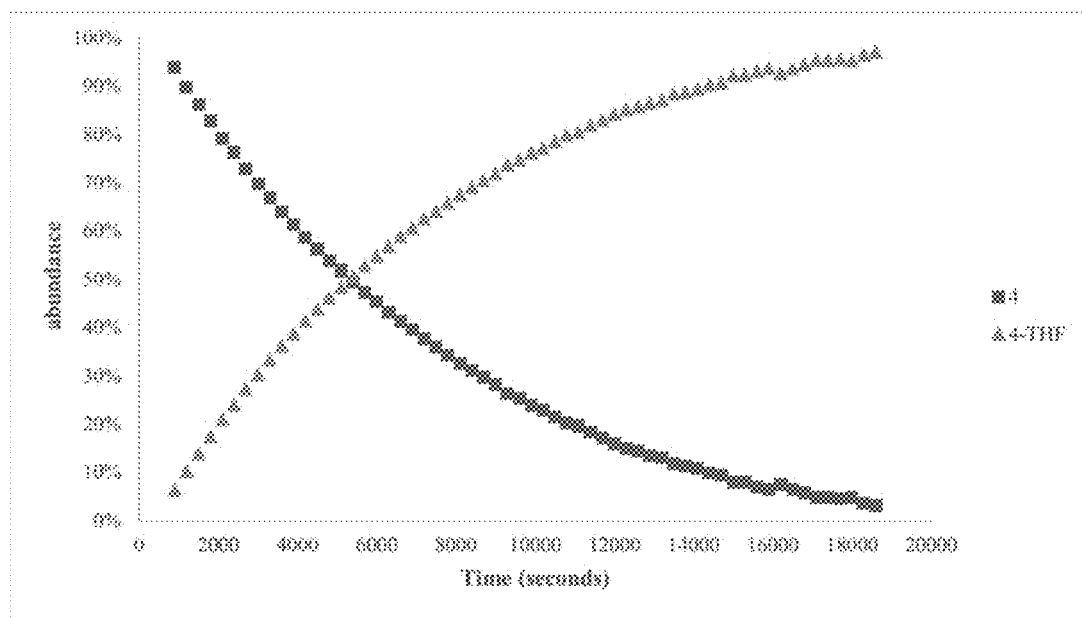
FIG. 3 shows a graph of the conversion of 4 into an equilibrium mixture of 4/4-THF. This process has a half-life of 89.0 min. (Initial concentration of 3=1.857×10$^{-2}$ M; 25° C.).

The conversion of 4 into an equilibrium mixture of 4/4-THF is shown in FIG. 3. The abundance percentage of 4 and 4-THF versus time is graphed in FIG. 3, wherein the initial concentration of $3=1.857 \times 10^{-2}$ M; 25° C.

Example 4: Polymerization

In an inert atmosphere glove box, a 20 mL vial was charged with 2 mL of toluene. Phenylacetylene (300 µL, 279 mg, 2.73 mmol) was added via micropipette. Catalyst (2) or (4) (546 nmol) was added via micropipette from a stock solution (5 mg/mL) in one shot to initiate polymerization. This solution was allowed to stir and then quenched by removing the vial from the glove box and pouring into excess methanol. The resulting polymers were isolated via filtration and residual solvent removed in vacuo. When using catalyst (4), catalyst (4) was generated in situ by adding dipropargylfluroene to complex (1) dissolved in 2 mL of toluene. This solution was allowed to stir for 5 min prior to addition of phenylacetylene to initiate polymerization. The yield and activity for the polymerizations is provided in Table 1, below, and the molecular weight and dispersity data is shown in Table 2, below. The root mean square radius of gyration were determined and compared with known linear polyphenylacetylene, as shown in FIG. 1.

TABLE 1

Yield and activity for catalysts 2 and 4.

| Time (min) | % Yield | | Activity ($g_{pol}/mol_{cat}/h$) | | Isolated yield (mg) | |
| --- | --- | --- | --- | --- | --- | --- |
| | 2 | 4 | 2 | 4 | 2 | 4 |
| 5 | 20 | 12 | $1.28 \times 10^6$ | $0.73 \times 10^6$ | 56 | 32 |
| 10 | 42 | 17 | $1.34 \times 10^6$ | $0.52 \times 10^6$ | 118 | 46 |
| 15 | 58 | 30 | $1.24 \times 10^6$ | $0.63 \times 10^6$ | 163 | 83 |
| 20 | 56 | 26 | $0.88 \times 10^6$ | $0.42 \times 10^6$ | 155 | 73 |
| 25 | 66 | 38 | $0.84 \times 10^6$ | $0.48 \times 10^6$ | 184 | 106 |

TABLE 2

| Sample | Mn (g/mol) | Mw/Mn |
| --- | --- | --- |
| 2-5 min | 156,500 | 1.995 |
| 2-10 min | 184,100 | 1.805 |
| 2-15 min | 94,300 | 1.939 |
| 2-20 min | 116,400 | 2.281 |
| 2-25 min | 112,100 | 1.898 |
| 4-5 min | 69,000 | 2.042 |
| 4-10 min | 66,200 | 1.881 |

TABLE 2-continued

| Sample | Mn (g/mol) | Mw/Mn |
| --- | --- | --- |
| 4-15 min | 87,900 | 1.826 |
| 4-20 min | 77,800 | 1.892 |
| 4-25 min | 60,300 | 1.900 |

Thus, Example 4 demonstrates polymerization of alkynes using the compounds having a structure according to formula (I) of the disclosure. Further, Example 4 demonstrates that the polymers prepared from the compounds having a structure according to formula (I) of the disclosure are cyclic, as shown in FIG. 1, wherein the root mean square radius of gyration is similar to that of polymers prepared using catalyst (2), which are known in the art to provide cyclic polymers, and less than that of known linear polymers.

What is claimed:

1. A compound having a structure represented by formula (I) or formula (IV):

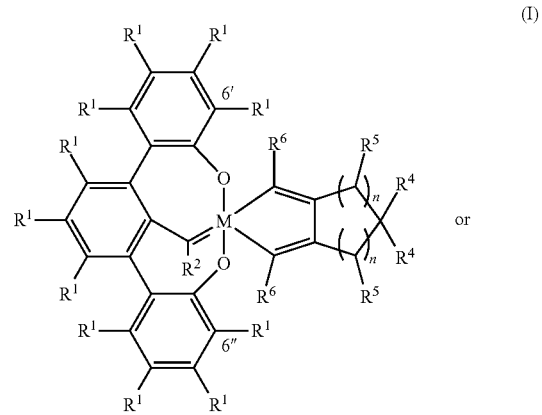

(I)

or

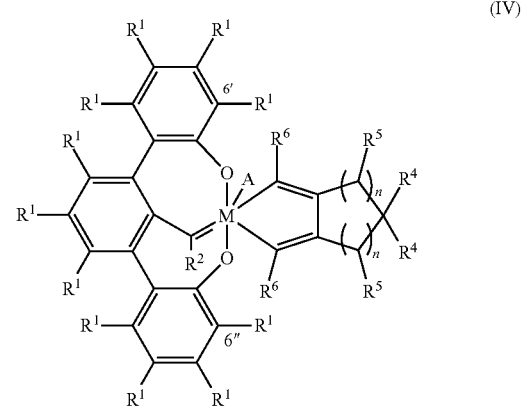

(IV)

wherein M is a transition metal;
each $R^1$ is independently H, $C_1$-$C_{20}$ alkyl, carboxyl, ester, amino, thiol, halo, $C_1$-$C_{22}$ haloalkyl, OH, or two adjacent $R^1$, together with the carbon atoms to which they are attached, form a five- to eight-member cyclic group;
$R^2$ is selected from $Ar^1$, $C_1$-$C_{22}$ alkyl, halo, $C_1$-$C_{22}$ haloalkyl, hydrogen, —$NH_2$, —N—($C_1$-$C_{22}$ alkyl)$_2$, —NH($C_1$-$C_{22}$ alkyl), —NHAr$^1$, —NAr$^1_2$, —O—Ar$^1$, —O—($C_1$-$C_{22}$ alkyl), and $(R^3)_3$—Si—;
each $R^4$ is independently $C_1$-$C_{22}$ alkyl or both $R^4$ together with the carbon atom to which they are attached form a spiro five- to eight-member monocyclic group or a spiro eleven- to thirty-member polycyclic group;

each $R^5$ is independently H, $C_1$-$C_{22}$ alkyl, —$NH_2$, —N—($C_1$-$C_{22}$ alkyl)$_2$, —NH($C_1$-$C_{22}$ alkyl), —NHAr$^1$, —NAr$^1_2$, —O—Ar$^1$, —OH, or —O—($C_1$-$C_{22}$ alkyl);

each n is independently 1, 2, 3, 4, or 5;

each $R^6$ is independently H, $C_1$-$C_3$ alkyl, halide, —$NH_2$, —N—($C_1$-$C_3$ alkyl)$_2$, —NH($C_1$-$C_3$ alkyl), —NHAr$^1$, —NAr$^1_2$, —O—Ar$^1$, —O—($C_1$-$C_3$ alkyl), —S—Ar$^1$, —S—($C_1$-$C_3$ alkyl);

each $R^3$ is independently selected from $C_1$-$C_{22}$ alkyl, Ar$^1$, —O—($C_1$-$C_{22}$ alkyl), —O—Ar$^1$, —N($C_1$-$C_{22}$ alkyl)$_2$, —NH($C_1$-$C_{22}$ alkyl), —$NH_2$, or —NH—Ar$^1$;

A is selected from the group consisting of $NH_3$, $N(R^7)_3$, Ar$^2$, $C_1$-$C_6$ hydroxyalkyl, $R^7OR^7$, $P(R^7)_3$, $R^7CHO$, $R^7COR^7$, $R^7COOR^7$, and $S(R^7)_2$;

each Ar$^1$ and Ar$^2$ is independently an $C_6$-$C_{22}$ aryl or 5-12 membered heteroaryl comprising from 1 to 3 heteroatoms selected from O, N, and S; and each $R^7$ is independently $C_1$-$C_{22}$ alkyl or Ar$^2$, or two $R^7$, together with the atoms to which they are attached, form a five- to eight-member heterocycle.

2. The compound of claim 1, wherein M comprises a group 6 transition metal.

3. The compound of claim 1, wherein the at least one $R^1$ comprises t-butyl.

4. The compound of claim 1, wherein the at least two $R^1$ comprise t-butyl.

5. The compound of claim 4, wherein the $R^1$ at the 6' carbon and the $R^1$ at the 6" carbon each comprises t-butyl.

6. The compound of claim 1, wherein $R^2$ comprises t-butyl.

7. The compound of claim 1, wherein both $R^4$ together with the carbon atom to which they are attached form a spiro five- to eight-member monocyclic group.

8. The compound of claim 1, wherein both $R^4$ together with the carbon atom to which they are attached form a spiro eleven- to thirty-member polycyclic group.

9. The compound of claim 1, wherein both $R^4$ together with the carbon atom to which they are attached form a fluorenyl group.

10. The compound of claim 1, wherein each $R^5$ is hydrogen.

11. The compound of claim 1, wherein both n are 1.

12. The compound of claim 1, wherein each $R^6$ is hydrogen.

13. The compound of claim 1, wherein A is THF.

14. The compound of claim 1, selected from the group consisting of

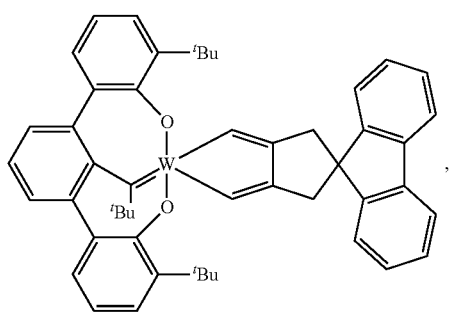

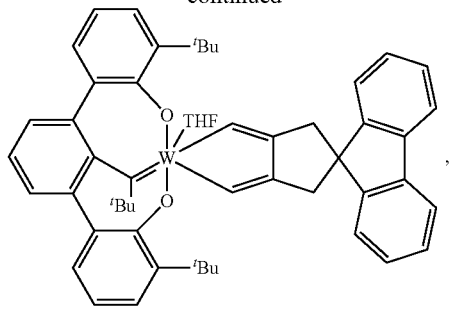

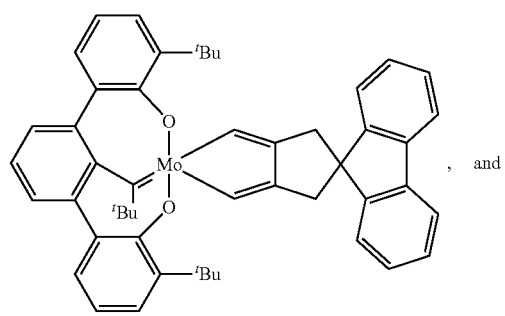

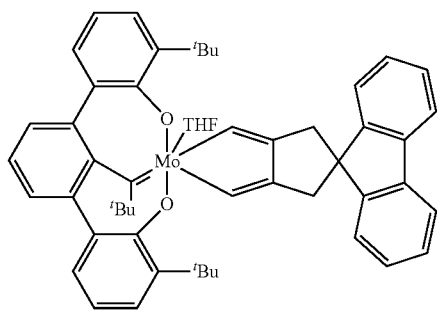

15. A method for making the compound according to claim 1, comprising reacting a complex of formula (II) and a dialkyne having a structure of formula (III) under conditions sufficient to form the compound according to claim 1;

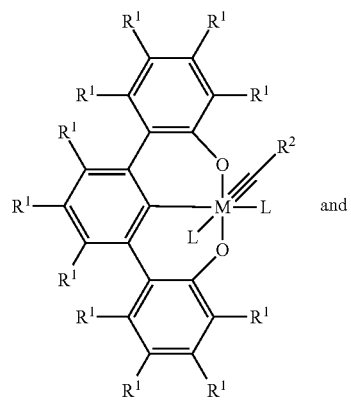

-continued

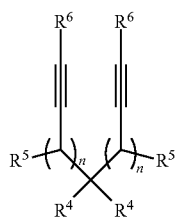
(III)

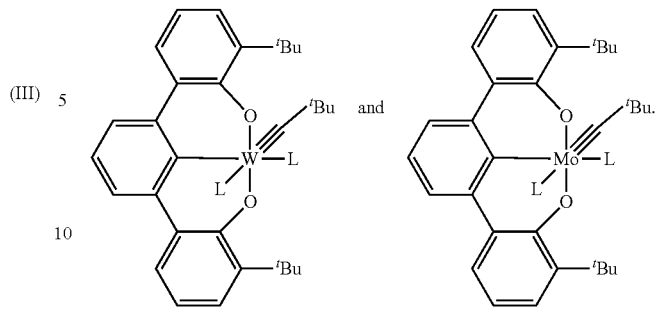

wherein each L is independently absent or selected from phosphine, phosphite, phosphonite, phosphinite, amine, amide, imine, alkoxy, ether, thioether, and a five- or six-membered monocyclic group having 1 to 3 ring heteroatoms;

or both L together comprise a bidentate ligand.

16. The method of claim 15, wherein the complex of formula (II) has a structure represented by a formula:

17. The method of claim 15, wherein at least one L is ether.

18. The method of claim 15, wherein at least one L is a five- or six-membered monocyclic group having 1 to 3 ring heteroatoms.

19. A method of preparing a cyclic polymer, comprising:
admixing a plurality of alkynes in the presence of the compound of claim 1 under conditions sufficient to polymerize the plurality of alkynes, thereby forming the cyclic polymer from the plurality of alkynes, wherein the cyclic polymer ring comprises alkene groups.

20. The method of claim 19, further comprising the step of hydrogenating the alkene groups.

* * * * *

UNITED STATES PATENT AND TRADEMARK OFFICE
CERTIFICATE OF CORRECTION

PATENT NO. : 12,077,626 B2
APPLICATION NO. : 17/436420
DATED : September 3, 2024
INVENTOR(S) : Adam S. Veige et al.

Page 1 of 1

It is certified that error appears in the above-identified patent and that said Letters Patent is hereby corrected as shown below:

In the Claims

At Column 24, Lines 46-48, "reacting a....................claim 1;" should be at Line 47, as a new sub-point.

At Column 26, Line 5, "and" should be -- or --.

Signed and Sealed this
Eighteenth Day of February, 2025

Coke Morgan Stewart
*Acting Director of the United States Patent and Trademark Office*